United States Patent [19]

Sakabe et al.

[11] 4,394,456

[45] Jul. 19, 1983

[54] TEMPERATURE-COMPENSATING CERAMIC DIELECTRICS

[75] Inventors: Yukio Sakabe, Kyoto; Goro Nishioka, Hirakata, both of Japan

[73] Assignee: Murata Manufacturing Co., Ltd., Kyoto, Japan

[21] Appl. No.: 366,328

[22] Filed: Apr. 7, 1982

[30] Foreign Application Priority Data

Apr. 13, 1981 [JP] Japan ................................. 56-56175

[51] Int. Cl.$^3$ .......................... C04B 35/46; H01B 3/12
[52] U.S. Cl. ..................................... 501/138; 501/139
[58] Field of Search ................................ 501/138, 139

[56] References Cited

U.S. PATENT DOCUMENTS 4,226,735 10/1980 Sakabe ................................. 501/139

FOREIGN PATENT DOCUMENTS 2848693 5/1979 Fed. Rep. of Germany ...... 501/136

Primary Examiner—Mark Bell
Attorney, Agent, or Firm—Birch, Stewart, Kolasch and Birch

[57] ABSTRACT

A temperature-compensating ceramic dielectric mainly comprises a composition consisting essentially of 35 to 65 wt % of neodymium titanates ($Nd_2Ti_2O_7$), 10 to 35 wt % of barium titanates ($BaTiO_3$), 10 to 35 wt % of titanium oxide ($TiO_2$), 1 to 6 wt % of bismuth oxide ($Bi_2O_3$) and 1 to 10 wt % of lead oxide ($Pb_3O_4$), and contains 1 to 6 wt % of zinc oxide (ZnO) and 1 to 6 wt % of silicon oxide ($SiO_2$). Up to 50 atom % of neodymium in neodymium titanates ($Nd_2Ti_2O_7$) may be replaced with at least one element of the other rare earth elements except for Nd.

2 Claims, No Drawings

TEMPERATURE-COMPENSATING CERAMIC DIELECTRICS

BACKGROUND OF THE INVENTION

1. Field of the Invention

The present invention relates to temperature compensating ceramic dielectrics. More particularly, it relates to ceramic dielectrics for temperature-compensating ceramic capacitors with a temperature coefficient of permittivity ranging from $+30 \times 10^{-6}$ to $-300 \times 10^{-6}/°C.$, high permittivity and high Q at high frequencies, that can be sintered at a relatively low temperature.

2. Description of the Prior Art

As a ceramic dielectric material for temperature-compensating ceramic capacitors, there have been known ceramic dielectrics mainly comprising neodymium oxide ($Nd_2O_3$), barium oxide (BaO) and titanium oxide ($TiO_2$), and containing a minor quantity of bismuth oxide ($Bi_2O_3$) or lead oxide (PbO or $Pb_3O_4$) incorporated therein. However, compositions of such dielectric materials have a high sintering temperature ranging from 1270° to 1400° C., resulting in the increase of manufacturing cost of capacitors. For example, multi-layer ceramic capacitors are generally produced by a process comprising the steps of preparing ceramic green sheets, forming an internal electrode on each ceramic green sheet, placing the resultant ceramic green sheets one over another, and firing the resultant multi-layered body. In such a process, baking of the internal electrodes is carried out simultaneously with the sintering of the ceramic material, so that a material for the internal electrodes is required to have a high melting point over the firing temperature of 1270° to 1400° C. It is therefore required to use a high-melting point, noble metal such as Pt, Au, Pd, etc., resulting in the increase of the cost of the multi-layer ceramic capacitors.

SUMMARY OF THE INVENTION

It is therefore an object of the present invention to provide temperature-compensating ceramic dielectrics which can be sintered at a low temperature which makes it possible to use a cheap material such as, for example, Ag-Pd alloy as a material for internal electrodes in multi-layer ceramic capacitors.

Another object of the present invention is to provide temperature-compensating ceramic dielectrics with a temperature coefficient of permittivity ranging from $+30 \times 10^{-6}$ to $-300 \times 10^{-6}/°C.$, high permittivity and high Q at high frequencies.

According to the present invention, there is provided a temperature-compensating ceramic dielectric consisting essentially of a composition consisting essentially of 35 to 65 wt% of neodymium titanate ($Nd_2Ti_2O_7$), 10 to 35 wt% of barium titanate ($BaTiO_3$), 10 to 35 wt% of titanium oxide ($TiO_2$), 1 to 6 wt% of bismuth oxide ($Bi_2O_3$) and 1 to 10 wt% of lead oxide ($Pb_3O_4$), and including 1 to 6 wt% of zinc oxide (ZnO) and 1 to 6 wt% of silicon oxide ($SiO_2$).

In the above ceramic dielectrics, up to 50 atom% of neodymium in neodymium titanate ($Nd_2Ti_2O_7$) may be replaced with at least one element of the other rare earth elements except for Nd. The rare earth elements except for Nd includes, without being limited to, La, Ce, Pr, Sm, etc.

The reasons why the compositional area of the ceramic dielectrics according to the present invention has been limited as above are as follows:

The content of neodymium titanate has been confined within the range of 35 to 65 wt% because if the content of neodymium titanate is less than 35 wt%, it causes a decrease of permittivity and a change for the worse in the temperature characteristics of the permittivity, and if the content of the neodymium titanate is more than 65 wt%, it results in a considerable change for the worse in the sintering property. The content of barium titanate has been confined within the range of 10 to 35 wt% for the reasons that if its content is less than 10 wt%, it results in a change for the worse in the sintering property, and that if its content is more than 35 wt%, it results in a change for the worse in sintering property and in the temperature characteristics of the permittivity. The content of titanium oxide has been confined within the range of 10 to 35 wt% because if the content of titanium oxide is less than 10 wt%, it results in a change for the worse in the sintering property and that, if more than 35 wt%, the temperature coefficient of the permittivity becomes large in the negative side. The content of bismuth oxide has been confined within the range of 1 to 6 wt% because if its content is less than 1 wt%, it results in a change for the worse in the sintering property, and if its content is more than 6 wt%, it causes a decrease in Q at high frequencies. The content of lead oxide has been confined within the range of 1 to 10 wt% because a content out of this range results in a change for the worse in the sintering property. The contents of zinc oxide and silicon oxide have been confined within the ranges of 1 to 6 wt% because if its content is less than 1 wt%, it causes the deterioration of the temperature characteristic of permittivity, and if the content is more than 6 wt%, it causes a decrease of the permittivity.

As mentioned above, up to 50 atom% of Nd in neodymium titanate which is a portion of the main component may be replaced up to 50 atom% with one ore more other rare earth elements. The replaceable amount of Nd has been confined to 50 atom% and less because if the replacement of Nd is more than 50 atom%, it is impossible to obtain ceramic dielectrics with a temperature coefficient of capacitance ranging from $+30 \times 10^{-6}$ to $-300 \times 10^{-6}/°C.$ including NPO.

The invention will now be further explained with reference to certain illustrative examples.

EXAMPLE

(Preparation of Raw Materials)

The oxides, neodymium oxide ($Nd_2O_3$), lanthanum oxide ($La_2O_3$), cerium oxide ($CeO_2$) and titanium oxide ($TiO_2$) were weighed in respective proportions so as to provide $Nd_2Ti_2O_7$, $NdLaTi_2O_7$ and $NdLa_{\frac{1}{2}}Ce_{\frac{1}{2}}Ti_2O_7$, mixed thoroughly in a ball mill, and then calcined at 1150° C. Barium oxide (BaO) and titanium oxide ($TiO_2$) were also weighed so as to provide $BaTiO_3$, mixed thoroughly in a ball mill, and then calcined at 1150° C. for 1 hour.

X-ray diffraction analysis of the resultant respective presintered material shows that there were produced $Nd_2Ti_2O_7$, $NdLaTi_2O_7$, $NdLa_{\frac{1}{2}}Ce_{\frac{1}{2}}Ti_2O_7$ and $BaTiO_3$, respectively.

(Preparation of Ceramic Dielectrics)

These raw materials were weighed together with titanium oxide ($TiO_2$), bismuth oxide ($Bi_2O_3$), lead oxide ($Pb_3O_4$), zinc oxide (ZnO) and silicon oxide ($SiO_2$) so as to provide ceramics each having a composition shown in Table 1. The resultant mixture of the raw materials was mixed by the wet process in a ball mill, dehydrated, dried and then calcined at 950° C. for 1 hour. The clinker is crushed, ball-milled by the wet process, and then granulated with an organic binder (10 wt% of polyvinyl alcohol). The resultant granulated material was formed into discs, and then fired at 1050° to 1150° C. to obtain sintered ceramics with a diameter of 14 mm and a thickness of 1 mm. Silver electrodes were provided on opposite planes of each ceramic disc by baking to provide test specimens.

The specimens were subjected to measurements of permittivity ($\epsilon$), Q and temperature coefficient of permittivity (TC) under the conditions of 25° C. and 1 MHz. The results are shown in Table 1. The temperature coefficient of permittivity was obtained by the measurement of permittivity within a temperature range of −55° to +125° C. The firing temperature is also shown in the table for each specimen.

As can be seen from the data for specimens Nos. 1 to 10, the compositions out of the scope of the present invention have a sintering temperature of 1150° C. and above and possess low permittivity.

The data for specimens Nos. 24 to 28 show that dielectrics comprising either ZnO and $SiO_2$ have a high sintering temperature. Also, it shows that incorporation of both ZnO and $SiO_2$ in amounts out of the range confined as above results in the decrease of permittivity and Q.

In contrast thereto, the ceramic dielectrics according to the present invention can be sintered at a temperature ranging from 1050° to 1100° C., and they possess high permittivity, high Q and a temperature coefficient of permittivity sufficient for practical use. Accordingly, when the ceramic dielectrics according to the present invention are used as a material for multi-layer ceramic capacitors, it is possible to use a cheap, low-melting point metal such as Ag-Pd alloy as a material for internal electrodes, thus making it possible to the decrease of the manufacturing cost of the capacitors.

In the above examples, the raw materials for the main component are used in the form of titanates of neodymium, lanthanum, cerium and barium, i.e., in the form of $Nd_2Ti_2O_7$, $NdLaTi_2O_7$, $NdLa_{\frac{1}{2}}Ce_{\frac{1}{2}}Ti_2O_7$ and $BaTiO_3$,

TABLE 1

| Specimen No | Main component (wt %) | | | | | Sub-component (wt %) | | Firing Temp. (°C.) | $\epsilon$ | Q | TC ($\times 10^{-6}$/°C.) |
|---|---|---|---|---|---|---|---|---|---|---|---|
| | $Nd_2Ti_2O_7$ | $BaTiO_3$ | $TiO_2$ | $Bi_2O_3$ | $Pb_3O_4$ | ZnO | $SiO_2$ | | | | |
| 1* | 67 | 16 | 10 | 4 | 3 | 1 | 1 | 1200 | 65.0 | 2000 | +45 |
| 2* | 60 | 8 | 20 | 6 | 6 | 1 | 1 | 1150 | 56.0 | 1500 | −65 |
| 3* | 60 | 20 | 8 | 7 | 5 | 1 | 1 | above 1200 | | | |
| 4* | 58 | 12 | 25 | 5 | 0 | 1 | 1 | above 1200 | | | |
| 5* | 58 | 12 | 25 | 0 | 5 | 1 | 1 | above 1200 | | | |
| 6* | 55 | 12 | 20 | 7 | 6 | 1 | 1 | 1150 | 72.6 | 700 | −54 |
| 7* | 45 | 37 | 10 | 4 | 4 | 1 | 1 | above 1200 | | | |
| 8* | 45 | 20 | 18 | 5 | 12 | 1 | 1 | above 1200 | | | |
| 9* | 41 | 12 | 37 | 4 | 6 | 1 | 1 | 1150 | 57.0 | 8300 | −150 |
| 10* | 34 | 26 | 30 | 5 | 5 | 1 | 1 | " | 79.0 | 7300 | −450 |
| 11 | 63 | 15 | 12 | 4 | 6 | 1 | 1 | 1050 | 72.4 | 2500 | +29 |
| 12 | 58 | 17 | 15 | 3 | 7 | 4 | 3 | 1100 | 74.2 | 4100 | +15 |
| 13 | 57 | 21 | 12 | 4 | 6 | 5 | 1 | 1050 | 82.6 | 5000 | +24 |
| 14 | 55 | 22 | 13 | 3 | 7 | 2 | 2 | 1050 | 83.9 | 5000 | +12 |
| 15 | 55 | 15 | 20 | 5 | 5 | 1 | 2 | 1100 | 71.2 | 8000 | −39 |
| 16 | 54 | 24 | 12 | 2 | 8 | 2 | 5 | 1050 | 85.5 | 6100 | −3 |
| 17 | 53 | 25 | 12 | 3 | 7 | 1 | 3 | " | 85.1 | 5300 | −20 |
| 18 | 47 | 23 | 20 | 1 | 9 | 2 | 2 | " | 79.0 | 4500 | −50 |
| 19 | 42 | 28 | 20 | 4 | 6 | 1.5 | 2 | 1150 | 82.3 | 6000 | −51 |
| 20 | 42 | 23 | 25 | 6 | 4 | 1 | 1 | 1050 | 79.6 | 6200 | −100 |
| 21 | 37 | 20 | 33 | 5 | 5 | 2 | 2 | " | 93.2 | 7200 | −289 |
| 22 | 54 ($NdLaTi_2O_7$) | 24 | 12 | 2 | 8 | 2 | 5 | 1100 | 81.0 | 5000 | −56 |
| 23 | 54 ($NdLa_{\frac{1}{2}}Ce_{\frac{1}{2}}Ti_2O_7$) | 24 | 12 | 2 | 8 | 2 | 5 | " | 85.4 | 6100 | −38 |
| 24* | 42 | 28 | 20 | 4 | 6 | 1 | 7 | 1100 | 69.3 | 2000 | −43 |
| 25* | 63 | 15 | 12 | 4 | 6 | 2 | 0 | above 1200 | | | |
| 26* | 63 | 15 | 12 | 4 | 6 | 1 | 7 | 1150 | 68.5 | 1000 | +29 |
| 27* | 63 | 15 | 12 | 4 | 6 | 0 | 2 | above 1200 | | | |
| 28* | 63 | 15 | 12 | 4 | 6 | 7 | 2 | 1100 | 53.2 | 2400 | +10 |

In Table 1, asterisked specimens show ceramic dielectrics out of the scope of the present invention, and others are ceramic dielectrics falling in the scope of the present invention. Since the specimens Nos. 3 to 5, 7, 8, 25 and 27 have a firing temperature more than 1200° C. and above, no data are shown in the table.

but they may be used in the form of their oxides or carbonates. In the foregoing, lead oxide is expressed by converting it into the weight of $Pb_3O_4$, but it is obvious that lead oxide may be used in the form of PbO.

In order to improve the characteristics of the ceramic dielectrics, a minor quantity of boron and/or alumina may be incorporated into the composition in addition to ZnO and SiO$_2$.

What we claim is:

1. A temperature-compensating ceramic dielectric consisting essentially of a composition consisting essentially of 35 to 65 wt% of neodymium titanate (Nd$_2$Ti$_2$O$_7$), 10 to 35 wt% of barium titanate (BaTiO$_3$), 10 to 35 wt% of titanium oxide (TiO$_2$), 1 to 6 wt% of bismuth oxide (Bi$_2$O$_3$) and 1 to 10 wt% of lead oxide (Pb$_3$O$_4$), and including 1 to 6 wt% of zinc oxide (ZnO) and 1 to 6 wt% of silicon oxide (SiO$_2$).

2. The temperature-compensating ceramic dielectric according to claim 1 wherein up to 50 atom% of neodymium in neodymium titanate (Nd$_2$Ti$_2$O$_7$) is replaced with at least one element of the other rare earth elements except for Nd.